United States Patent Office 3,329,665
Patented July 4, 1967

3,329,665
POLYMERISATION PROCESS
Kenneth Henry Charles Bessant, Banstead, and Stefan Kazimierz Lachowicz, London, England, assignors to The Distillers Company Limited, Edinburgh, Scotland, a British company
No Drawing. Filed June 20, 1956, Ser. No. 592,480
Claims priority, application Great Britain, June 28, 1955, 18,572/55; Feb. 1, 1956, 3,145/56
1 Claim. (Cl. 260—93.7)

This invention relates to a process for the polymerisation of $\alpha$-olefins to give high molecular weight products. It particularly relates to a process for the production of high molecular weight polyolefins under mild conditions of temperature and pressure.

Hitherto the commercially practical processes for the polymerisation of $\alpha$-olefins such as ethylene to give resins of technical importance have involved the use of high temperatures and very high pressures.

It has been proposed to form high molecular weight polymers of ethylene by processes which comprise contacting gaseous ethylene with a catalyst system consisting of a mixture of aluminium trialkyls or of organic derivatives of aluminium having the formula $R_2AlX$ or organic derivatives of magnesium or zinc in conjunction with a compound of a metal of Groups IVa to VIa of the Periodic Table. In the above formula R is hydrogen or a hydrocarbon radical or residue and X is hydrogen, a halogen atom, an alkoxy group, an aryloxy group, a radical derived from a secondary amine, a secondary amide, a mercaptan, a thiophenol, a carboxylic acid or a sulphonic acid. The organic derivatives of zinc and magnesium mentioned in these prior proposals are the dialkyl derivatives and the Grignard-type compounds.

These processes yield valuable products but suffer from the disadvantage that many of the organo-metallic compounds present in the catalyst system are not readily available on the commercial scale. Moreover many of the compounds are not stable or easily handled and also many are pyrophoric or at least inflammable and decomposed by oxygen in air.

An object of the present invention is to provide a process for the production of high quality, high molecular weight polyethylene and other poly-$\alpha$-olefins by a process which involves the use of readily available organo-metallic compounds which are comparatively stable and easy to handle. It is a further object to provide a process whereby the polymerisation of ethylene and other $\alpha$-olefins may be effected rapidly under mild conditions of temperature and pressure. Another object is to provide a process for the polymerisation of $\alpha$-olefins whereby substantially linear polymers are obtained.

Accordingly the present invention is the process for the polymerisation of $\alpha$-olefins having the formula $$CH_2\!\!=\!\!CHR$$

where R is an alkyl group or hydrogen which comprises contacting the $\alpha$-olefin with a catalyst system formed by mixing a lead tetra-alkyl compound with a halide of titanium, zirconium or vanadium.

Any $\alpha$-olefin having the above formula can be polymerised according to the process of the present invention. Examples of suitable olefins include ethylene, propylene, 1-n-butene, 1-n-pentene and 1-n-hexene. Outstandingly useful products are obtained from ethylene and propylene. The $\alpha$-olefins can be polymerised alone to give high molecular weight homopolymers or they can be copolymerised with each other to give valuable copolymers.

Any lead tetra-alkyl compound may be used to form the catalyst systems of the present invention, but it is preferred to use lead tetra-ethyl which is a compound readily available on the commercial scale.

Any of the halides of titanium, zirconium or vanadium can be used, together with the lead alkyl compound, to form the catalyst system of the present invention. The most readily available compounds are the chlorides of the metals of which titanium is preferred. Particularly effective catalyst systems are prepared by using titanium tetra-chloride, titanium tri-chloride or zirconium tetrachloride. Titanium tetrachloride is a covalent liquid which is readily available on the commercial scale and is therefore particularly useful.

It is preferred that the catalyst systems used in the process of the present invention should be formed from a molar excess of the lead tetra-alkyl compound over the metallic halide present and preferably at least two molar proportions of the lead tetra-alkyl compound are employed to each molar proportion of the metallic halide, particularly when the metal is in a very high valency state, e.g. as in the case of titanium tetrachloride.

The preparation of the catalyst system by mixing its two essential components and the subsequent polymerisation reaction are preferably effected in the absence of molecular oxygen, carbon dioxide and water. Most suitably all reactions are carried out in an atmosphere of the $\alpha$-olefins to be polymerised when it is a gas or of an inert gas, for example, nitrogen, when it is a liquid. An inert gas can also be used to flush out the polymerisation vessel prior to the admission of the various components of the reaction mixture. The catalyst systems or their components are destroyed by reaction with oxygen, carbon dioxide or water and, consequently, if any of these are present in excess little or no polymerisation will take place. Small quantities of oxygen, carbon dioxide or water are removed by reaction with part of the catalyst system or its components and any undestroyed catalyst left after this reaction initiates polymerisation in the usual way.

The process of the present invention is most suitably carried out with the components of the reaction dispersed throughout an inert liquid vehicle and, when the $\alpha$-olefin to be polymerised is normally a gas, the latter can be bubbled through the liquid vehicle containing the catalyst system. The liquid vehicle is preferably a solvent for at least one of the compounds which react together to form the catalyst system and for the $\alpha$-olefin employed. Suitable liquid vehicles are aliphatic, cycloaliphatic and hydrogenated aromatic hydrocarbons, for example pentane, hexane, cyclohexane, tetrahydronaphthalene and decahydronaphthalene; the higher paraffins; aromatic hydrocarbons, for example benzene and xylene; halogenated aromatic hydrocarbons, for example ortho-dichlorbenzene and chlorinated naphthalene; and mixtures of these liquids. The quantity of liquid vehicle employed can be varied considerably and should be such that the final recovery of the product is facilitated.

The catalyst systems of the present invention are generally sufficiently active for polymerisation to be initiated at normal ambient temperatures. The rate of polymerisation is generally increased by raising the temperature of the reaction mixture, but normally it is undesirable to employ temperatures far in excess of 150° C.

It is unnecessary to employ elevated pressures in order to bring about the polymerisation of $\alpha$-olefins according to the present invention. However, for convenience of handling normally gaseous olefins, such as ethylene and propylene, it is advantageous to employ slightly elevated pressures and preferably the present process is carried out with such olefins under a pressure in the range 50–500 pounds per square inch gauge (p.s.i.g.).

The polymerisation of the $\alpha$-olefins can be brought about by mixing the essential components of the catalyst system in a suitable inert liquid vehicle and then adding the $\alpha$-olefin to the catalyst system so formed.

However a preferred procedure which gives rise to improved polymerisation systems, particularly when polymerising a gaseous α-olefin such as ethylene, comprises mixing the components in the presence of the α-olefin to be polymerised. This procedure can be carried out when using a gaseous α-olefin by mixing one of the components of the catalyst system with an inert liquid vehicle and then saturating the mixture and the vessel containing it with the α-olefin. The second component is then added and it will be found that rapid polymerisation takes place and that further quantities of the α-olefin can be passed into the reaction mixture and polymerised. As stated above it is preferred to employ a molar excess of the lead tetra-alkyl compound on the halide compound employed and therefore a most convenient procedure for carrying out this preferred embodiment of the present invention as applied to the polymerisation of a normally gaseous olefin comprises dissolving the molar excess of the lead tetra-alkyl compound in an inert liquid vehicle and saturating the solution and the polymerisation vessel with the α-olefin and finally adding the halide compound, if desired, dissolved in a further quantity of the inert liquid vehicle.

When the α-olefin to be polymerised is a liquid under the polymerisation conditions no inert diluent is necessary but one can be used if desired. The preferred procedure is carried out by dispersing or dissolving one of the components of the catalyst system in the α-olefin, or in a solution of the α-olefin in an inert liquid vehicle, and subsequently adding the second component of the catalyst system to the reaction mixture.

The poly-α-olefins, including polyethylene, produced by the present invention are recovered from the reaction mixtures and worked into a final form by standard procedures, for instance as described in the literature. It is advantageous to include a mineral acid washing stage in the working up in order to remove inorganic contaminants.

The process may be carried out batchwise or continuously and by its use high yields of high grade polymers can be produced.

The following examples illustrate embodiments of the process of the present invention.

Example 1

A pressure reactor of 300 millilitres in capacity was charged with a solution of 10 millilitres of lead tetraethyl in 150 millilitres of petroleum ether (B.P. 100–120° C.) after placing in it a sealed glass vial containing 2 millilitres of titanium tetrachloride. The reactor was evacuated to remove oxygen and ethylene was let in at 600 p.s.i.g. The pressure inside the reactor fell on shaking to 240 p.s.i.g. owing to dissolution of ethylene in the solvent. The glass vial containing titanium tetrachloride was then broken by a crushing device and the contents of the vessel were well mixed by shaking, thus forming the catalyst system in the presence of the ethylene. A rise of temperature was observed accompanied by a drop of pressure. In one hour the pressure fell to 90 p.s.i.g., the reactor remaining quite warm. It was charged again with ethylene to 600 p.s.i.g. and shaken. After one hour the pressure fell to 170 p.s.i.g. Eight grams of residual gas were bled out and the reactor was opened to yield a brown mass which turned slowly white on exposure to air. After washing twice with a solution of hydrochloric acid in methanol and twice with methanol about 20 grams of a white powdery polymer were obtained. The polymer, which could be pressed into a transparent, tough, flexible film, had a crystalline melting point of 133.5° C., and a tensile strength of 4,000 pounds per square inch.

Example 2

1850 millilitres of dry petroleum ether (B.P. 100–120° C.) was introduced into a stainless steel pressure reactor (capacity 1 gallon) equipped with a mechanical stirrer and previously thoroughly dried and purged with nitrogen. 20 millilitres of titanium tetrachloride dissolved in 150 millilitres of petroleum ether (B.P. 100–120° C.) was added quickly, the stirrer was started and 60 millilitres of lead tetraethyl was then run in slowly. The contents of the reactor were warmed up to 60° C. and propylene was let in at 75 p.s.i.g. The propylene consumption started at once but the pressure was maintained constant during the whole operation at 75 p.s.i.g. The temperature inside the reactor rose to 65° C. and remained 5° C. higher than the heating jacket temperature for several hours. After the temperature inside the reactor returned to 60° C. the gas consumption still continued but at a smaller rate. After 48 hours the reactor was cooled down, the pressure released and 500 millilitres of methanol were stirred with the reaction mixture for 30 minutes to destroy the unused catalyst. The free liquid was drained off through a plug at the bottom of the reactor, but the solid, swollen mass of grey polymer remaining in the reactor had to be taken out through the top. The polymer was washed with acetone containing hydrochloric acid and with methanol acidified with nitric acid. Altogether 480 grams of white, solid polypropylene was obtained. The product was completely soluble in boiling toluene, but only partially soluble in boiling petroleum ether (B.P. 100–120° C.).

Substantially similar polymerisation systems are obtained by replacing the titanium chloride employed in Examples 1 and 2 with equivalent quantities of zirconium tetrachloride, vanadium tetrachloride or titanium trichloride.

We claim:

In the polymerisation of propylene to a solid polymer, the improvement which comprises effecting the polymerisation in the presence of a catalytic mixture of tetraethyl lead and titanium trichloride.

References Cited

UNITED STATES PATENTS 2,721,189 8/1954 Anderson et al. ----- 260—94.9
2,772,259 11/1956 Hagemeyer -------- 260—94.9

FOREIGN PATENTS 538,782 12/1955 Belgium.
547,618 11/1956 Belgium.

OTHER REFERENCES

Bawn et al.: Discussions Faraday Soc., 1947, No. 2, pages 228–236.

JOSEPH L. SCHOFER, *Primary Examiner.*

M. LIEBMAN, B. E. LANHAM, G. H. GASTON, A. M. BOETTCHER, F. L. DENSON, S. ASTOR, M. AXELRAD, J. C. LAPRADE,
*Assistant Examiners.*